United States Patent [19]

Finley

[11] 3,898,160
[45] Aug. 5, 1975

[54] RECOVERING PROTEINS FROM WASTE WATER

[75] Inventor: John W. Finley, Martinez, Calif.

[73] Assignee: The United States of America as represented by the Secretary of Agriculture, Washington, D.C.

[22] Filed: Nov. 20, 1973

[21] Appl. No.: 417,696

Related U.S. Application Data

[63] Continuation-in-part of Ser. No. 275,008, July 25, 1972, abandoned.

[52] U.S. Cl. .............. 210/45; 210/53; 260/112 R; 426/271; 426/364
[51] Int. Cl. ............................................. C02b 1/20
[58] Field of Search ........ 260/112 R, 118, 120, 122; 210/52, 53, 45, 42, 51, 47; 426/271, 364; 71/25, 26, 33

[56] References Cited
UNITED STATES PATENTS

| | | | |
|---|---|---|---|
| 2,204,703 | 6/1940 | Sanders | 260/112 R |
| 2,377,624 | 6/1945 | Gordon | 260/112 R |
| 2,379,929 | 7/1945 | Rushton | 260/112 R |
| 2,429,579 | 10/1947 | Horvath | 260/112 R |
| 2,726,235 | 12/1955 | Rane et al. | 260/112 R |
| 3,491,080 | 1/1970 | Ehrensvard et al. | 260/112 R |
| 3,823,127 | 7/1974 | Jones et al. | 210/42 |

Primary Examiner—Thomas G. Wyse
Assistant Examiner—Benoit Castel
Attorney, Agent, or Firm—M. Howard Silverstein; Max D. Hensley; William Takacs

[57] ABSTRACT

Treatment of proteinaceous waste waters which provides recovery of valuable proteins and formation of effluents acceptable for disposal into municipal sewage systems or into waterways. Feature of invention is that waste water is treated with a molecularly-dehydrated phosphate and a polyvalent metal salt at pH 7 to precipitate a polyvalent metal-protein-phosphate complex.

6 Claims, No Drawings

RECOVERING PROTEINS FROM WASTE WATER

This is a continuation-in-part of my copending application Ser. No. 275,008, filed July 25, 1972, and now abandoned.

DESCRIPTION OF THE INVENTION

The invention relates to and has among its objects the provision of novel methods for treating proteinaceous waste waters whereby to obtain the dual advantages of recovering valuable proteins and avoiding pollution of waterways. Further objects and advantages of the invention will be evident from the following description wherein parts and percentages are by weight unless otherwise specified.

Proteinaceous waste waters from operations such as production of vital gluten, starch, beer, and the like, were heretofore deposited in our nation's waterways. Since these waste effluents contain up to 5 per cent solids (mostly protein), they are a major source of water pollution. Adverse legislation now prevents deposition of these waste liquors into lakes, rivers, municipal sewage treatment systems, and so forth. Consequently, manufacturers are being forced to clean up their waste waters at great expense or to shut down operations completely.

The invention described herein provides a means for obviating the problems outlined above. Thus, it provides a simple and inexpensive procedure whereby the waste water is rendered suitable for disposal into municipal treatment plants or waterways, and it yields the further advantage that valuable products—particularly proteins—are recovered from the waste water.

In a practice of the invention there is added to the waste water a molecularly-dehydrated phosphate and a water-soluble salt which provides polyvalent metal ions—preferably ferric or calicum ions. Also, the pH of the mixture is adjusted to 7. This results in precipitation of a polyvalent metal-protein-phosphate complex.

Separation of this complex yields an effluent which may be discharged directly into a sewage treatment system or a water course. The precipitated complex can be utilized in various ways. For example, it may be treated to recover the protein therefrom. Alternatively, where a ferric salt is used in the precipitation, the resulting ferric-protein-phosphate complex can be used per se as a source of nutritional iron in, for example, animal feeds.

DETAILED DESCRIPTION OF THE INVENTION

In a practice of the invention, an alkali metal molecularly-dehydrated phosphate is added to the waste water. These compounds are referred to as "molecularly-dehydrated" since they contain a lesser proportion of water than the orthophosphates. They are sometimes referred to as "condensed phosphates," and the literature discloses that they are characterized by containing phosphorus-oxygen linkages joined together in chains, rings, or branched structures. Included among the compounds of this category are the alkali metal dipolyphosphates (usually termed "pyrophosphates"), such as sodium pyrophosphate ($Na_4P_2O_7$). Also included are the higher polyphosphates, for example, sodium tripolyphosphate ($Na_5P_3O_{10}$), sodium tetrapolyphosphate ($Na_6P_4O_{13}$), and other salts of the formula $M_{n+2}P_nO_{3n+1}$ wherein M is an alkali metal and n is the number of phosphorus atoms, usually 2 to 6. Another useful category of these compounds are the polymetaphosphates, for example, sodium trimetaphosphate ($Na_3P_3O_9$), sodium tetrametaphosphate ($Na_4P_4O_{12}$), sodium hexametaphosphate ($Na_6P_6O_{18}$), and other polymetaphosphates of the formula $M_n(PO_3)_n$ wherein M is an alkali metal and n represents the number of repeating units, usually 3 to 6. Still another useful category of these compounds are those generally termed "phosphate glasses" which may be designated by the formula $(M_2O)_x(P_2O_5)_y$ wherein M is an alkali metal and wherein the ratio of $x:y$ is in the range from about 0.4:1 to 1.7:1. The additive used in accordance may be a single individual compound or it may be a mixture of different molecularly-dehydrated phosphates. Many of these compounds, particularly the phosphate glasses, are mixtures rather than individuals but nonetheless are useful in that form. Particularly preferred are sodium tetrametaphosphate, sodium hexametaphosphate, sodium tripolyphosphate, and mixtures such as, for example, a commercial product containing 25% $Na_6P_6O_{18}$ and 75% $Na_5P_3O_{10}$. Generally, the phosphate is applied in quantities such that the final concentration thereof is between 0.0001 and 0.10 M.

Following addition of the molecularly-dehydrated phosphate, or concomitantly therewith, a source of polyvalent metal ions is added.

In the following description, emphasis is directed to the use of ferric ion as the polyvalent metal ion. This is by way of illustration and not limitation. In its broad ambit, the invention encompasses the use of such polyvalent ions as calcium, magnesium, barium, lead, copper, nickel, cobalt, aluminum, manganese, and the like. It is of course obvious that such ions are readily provided by the use of water-soluble salts of these metals, such as chlorides, bromides, bisulphites, sulphates, nitrates, etc. Usually enough of the salt is employed to provide a concentration of the polyvalent metal ion of 0.001 to 0.1 M. Water-soluble ferric and calcium salts are preferred because they are non-toxic, effective, and relatively inexpensive. The use of ferric salts also provides a special advantage—as hereinafter explained—of providing a product useful as a source of nutritional iron.

Following addition of the molecularly-dehydrated phosphate and the polyvalent metal salt, the pH of the mixture is adjusted to 7.0 to effect immediate and complete precipitation of the protein as a polyvalent metal-protein-phosphate complex.

The criticality of pH in carrying out the precipitation is explained below, having particular reference to ferric ion as illustrative of the action which equally occurs with calcium or other polyvalent ions: As noted above, in accordance with the invention the treatment is conducted at a pH of 7 whereby a ferric-protein-phosphate complex is precipitated. This complex has maximum insolubility at pH 7 but is increasingly soluble at pH's below 7 and above 7. Thus if one were to use a pH below 7, a protein-phosphate complex rather than a ferric-protein-phosphate complex would be precipitated. On the other hand, if one were to use a pH above 7, the protein would remain in solution and a ferric phosphate would be precipitated. In sum, by using a pH of 7, the process of the invention realizes a maximum precipitation of the desired ferric-protein-phosphate complex and minimizes precipitation of both protein-phosphate complex and ferric phosphate.

After conducting the precipitation as described above the ferric-protein-phosphate complex (or other polyvalent metal-protein-phosphate complex) is removed by filtration, centrifugation or other mechanical separation technique, leaving a clear effluent which can be discharged into a municipal sewage treatment plant or water course. In an alternative embodiment of the invention, the waste water is treated with the molecularly-dehydrated phosphate, the pH is adjusted to 7, and the liquid is passed through a filter bed containing ferric ions (or other polyvalent metal ions) whereby to cause precipitation of the protein in the form of a ferric-protein-phosphate complex and also filter off this complex, providing a clear effluent ready for disposal.

One advantage of the invention is that the so-treated water has a chemical oxygen demand (referred to in the art as COD) of less than 1000. The COD before removal of protein is approximately 30,000 to 60,000. Chemical oxygen demand is the amount of oxygen necessary for chemical degradation of solid waste within the water. High values for COD lead to deleterious effects upon the environment. As a consequence, most municipalities have banned discharge of waste liquors into sewage systems if such liquors have a COD greater than 1500. Water treated by the methods of the invention falls well below this limit.

Another advantage of the invention is that if the waste water contains starch, most of this (at least 50%) will be removed with the precipitate. Removal of starch thus further lowers the COD of the resulting effluent.

Another advantage of the invention is that valuable proteins can be obtained from the precipitate formed as above described. These proteins can be recovered by the following procedure: The precipitate is treated with aqueous alkali to provide a pH of 9 or greater. Under these alkaline conditions the polyvalent metal-protein-phosphate complex is decomposed and the protein is dissolved, leaving the polyvalent metal phosphate as a precipitate. The latter is separated by centrifugation or filtration and the resulting solution is then treated to recover the protein therefrom. This can be accomplished by conventional operations such as lyophilization, dialysis, or the like. The recovered protein may be used primarily as an animal feed. Use of the protein for human purposes would require further purification, which can be accomplished by well-known techniques. Protein can be recovered from waste water in yields greater than 90% and may be used to feed such animals as ruminants, poultry, fish, swine, etc. Money obtained from the sale of these valuable proteins may be used to offset the expense involved in cleaning up proteinaceous waste water.

Another advantage of the invention is that the phosphates are recoverable and thus may be used over and over in subsequent waste water treatments. In particular, the phosphate can be isolated by ion-exchange techniques.

A particular advantage of the invention with respect to the use of ferric ions is that the recovered ferric-protein-phosphate complex is an excellent source of nutritional iron. Indeed, the recovered complex will supply iron at a bio-availability of greater than 90%, based on a ferrous sulphate standard of 100%. Ferrous sulphate is noted as the standard because it is used commercially as a source of dietary iron in flour and other food products.

The invention is further demonstrated by the following illustrative examples.

EXAMPLE 1

REMOVAL OF PROTEIN FROM LABORATORY WASTE EFFLUENT

The effluent was first prepared as follows: 700 ml. of water was slowly added to 1000 g. of first clears flour in a Hobart A-200 mixer equipped with a dough hook and operated at low speed. The dough was worked an additional 5 minutes. Then, the dough ball was covered with 5 l. of water and let stand for 1 hour at 21°C., after which mixing was resumed for 7 minutes. The starch milk was carefully decanted and 5 l. of water was placed on the dough, which was again worked for 7 minutes. Washing was repeated twice, such that the volume of starch milk totaled 20 l. The starch was removed by centrifuging for 5 minutes at 2000 rpm in 250 ml. bottles, yielding a supernatant effluent of 0.84% solids.

The various phosphates were dissolved in distilled water to form 0.25 M stock solutions.

To achieve a final phosphate concentration of 0.05 M, 5 ml. of 0.25 M stock phosphate solution was added to 20 ml. of effluent. The pH of the effluent was adjusted to 7, using 1 N sodium hydroxide. Immediately following the pH adjustment, calcium bisulfite was added to a concentration of 0.10 M and the effluent was centrifuged at 2000 rpm for 5 minutes.

This reaction was repeated several times, using a different phosphate. The amount of protein remaining in solution was determined by the Folin-Lowrey method. For convenience the per cent of protein remaining in solution is subtracted from 100 to give the percentage of protein removal. The results are summarized below:

| Condensed phosphate | Protein removal (%) |
| --- | --- |
| Hexametaphosphate | 90 |
| Tetrametaphosphate | 80 |
| Metaphosphate | 70 |
| Tripolyphosphate | 65 |
| Trimetaphosphate | 60 |
| Pyrophosphate | 55 |

EXAMPLE 2

Removal of Protein from Commercial Proteinaceous Waste Effluent

Effluent samples were obtained from commercial gluten washing plants and were treated with an equimolar mixture (0.01 M of each) of five phosphates—metaphosphate, pyrophosphate, tripolyphosphate, tetrametaphosphate, and hexametaphosphate—as described in Example 1. Calcium oxide was added until a pH of 7.0 was obtained, and the mixture was centrifuged to remove the precipitate. The amount of protein remaining in the residual effluent was determined by the Folin-Lowrey method. The results from three different commercial waste streams are summarized below. Stream A was treated 10 minutes after separation from the main stream; streams B and C were treated 3 days after separation.

| Sample | Total solids (%) | Protein (%) | Protein removed (%) | Carbohydrate (%) | Carbohydrate removed (%) |
|---|---|---|---|---|---|
| Before | | | | | |
| A (10 min.) | 1.110 | 0.268 | | | |
| B (3 days) | 2.296 | 0.570 | | 1.03 | |
| C (3 days) | 1.791 | 0.353 | | 0.42 | |
| After | | | | | |
| A | 0.831 | 0.06 | 74.9 | | |
| B | 0.92 | 0.03 | 78.6 | 0.40 | 62.6 |
| C | 0.55 | 0.19 | 77.6 | 0.21 | 50.0 |

EXAMPLE 3

Removal of Protein from Brewer's Waste Effluent

Effluent samples were obtained from a commercial brewer's waste treatment plant and were adjusted to 0.01 M tripolyphosphate as described in Example 1. Calcium chloride was added to reach a final concentration of 0.04 M. The pH was adjusted to 7.0 by addition of 1 N sodium hydroxide, and the mixture was centrifuged to remove the solids. The amount of protein remaining in the residual effluent was determined by the Folin-Lowrey method.

The above example was repeated, using hexametaphosphate in place of tripolyphosphate.

The results are summarized as follows:

| Sample | Total solids (%) | Protein (%) | Protein removed (%) | Carbohydrate (%) | Carbohydrate removed (%) |
|---|---|---|---|---|---|
| Untreated | 3.61 | 1.85 | | 1.93 | |
| Tripolyphosphate | 0.19 | 0.0057 | >99 | 0.10 | 95 |
| Hexametaphosphate | 0.17 | 0.0057 | >99 | 0.09 | 95 |

EXAMPLE 4

Removal of Protein from Waste Effluent Using Ferric Ions

The effluent was first prepared as follows: 700 ml. of water was slowly added to 1000 g. of white flour in a Hobart A-200 mixer equipped with a dough hook and operated at low speed. The dough was worked an additional 5 minutes. Then, the dough ball was covered with 5 l. of water and let stand for 1 hour at 21°C., after which mixing was resumed for 7 minutes. The starch milk was carefully decanted and 5 l. of water was placed on the dough, which was again worked for 7 minutes. Washing was repeated twice, such that the volume of starch milk totaled 20 l. The starch was removed by centrifuging for 5 minutes at 2000 rpm in 250 ml. bottles, yielding a supernatant effluent of 0.84% solids.

To achieve a final phosphate concentration of 0.0025 M, 200 ml. of 0.25 M stock sodium hexametaphosphate solution was added to 20 l. of the above effluent. Next, 50 ml. of 1 M ferric chloride was added. The pH of the effluent was adjusted to 7, using 1 N sodium hydroxide. Immediately following the pH adjustment, the so-treated effluent was centrifuged at 2000 rpm for 3 minutes to collect the ferric-protein-phosphate complex that had precipitated immediately on pH adjustment to 7.0.

The ferric-protein-phosphate complex contained 4.1% of iron. The yield of recovered protein was 84.5% and of recovered iron was 98.2%.

The above complex was then used in rat-feeding experiments. In these tests, the complex was incorporated into a standard (iron-free) ration in a concentration to provide 20 parts per million (ppm) of iron. The rats were fed this supplemented ration for an 18 day period, and availability of the iron was determined by measurement of the hemoglobin gain.

For comparison, a similar feeding study was conducted using ferrous sulphate (also at a level of 20 ppm) in place of the ferric-protein-phosphate complex.

The results obtained are tabulated below.

| Iron source | Body weight gain, g. | Hemoglobin gain, % | Feed intake, g. | Iron intake, mg. | Availability of iron, % |
|---|---|---|---|---|---|
| Ferric-protein-phosphate | 117 ± 10 | 5.5 | 317 | 6.34 | 92 |
| Ferrous sulphate | 113 ± 4 | 5.8 | 303 | 6.05 | 100 |
| None | 92 ± 12 | −0.1 | 273 | — | — |

Having thus described my invention, I claim:

1. A method for removing proteins, starch, and other materials from proteinaceous waste water, thereby producing both an effluent capable of disposal into municipal waste treatment systems or waterways and a solid ferric-protein-phosphate complex, said complex being susceptible to facile recovery of the valuable proteins contained therein, which comprises:

a. adding to the proteinaceous waste water an alkali metal salt of a molecularly-dehydrated phosphate until the concentration thereof is 0.0001 M to 0.1 M and a source of ferric ions until the concentration thereof is 0.001 M to 0.1 M, b. precipitating a ferric-protein-phosphate complex and avoiding precipitation of a protein-phosphate complex by raising the pH of the so-treated waste to a pH of 7.0, and c. separating the effluent from the said ferric-protein-phosphate complex precipitate.

2. A method for removing proteins, starch, and other materials from proteinaceous waste water, thereby producing both an effluent capable of disposal into municipal waste treatment systems or waterways and a solid calcium-protein-phosphate complex, said complex being susceptible to facile recovery of the valuable proteins contained therein, which comprises:

a. adding to the proteinaceous waste water an alkali metal salt of a molecularly-dehydrated phosphate until the concentration thereof is 0.0001 M to 0.1 M and a source of calcium ions until the concentration thereof is 0.001 M to 0.1 M, b. precipitating a calcium-protein-phosphate complex and avoiding precipitation of a protein-phosphate complex by raising the pH of the so-treated waste to a pH of 7.0, and c. separating the effluent from the said calcium-protein-phosphate complex precipitate.

3. A method for removing proteins, starch, and other material from proteinaceous waste water, thereby rendering the effluent capable of disposal into municipal waste treatment systems or waterways, which comprises:

a. adding thereto an alkali metal salt of a molecularly-dehydrated phosphate to a concentration of 0.0001 M to 0.1 M, b. raising the pH of the so-treated waste to a pH of 7.0, and c. precipitating and removing a ferric-protein-phosphate complex by passing the so-treated waste water through a filter bed composed essentially of a ferric ion source.

4. A method for removing proteins, starch, and other materials from proteinaceous waste water, thereby rendering the effluent capable of disposal into municipal waste treatment systems or waterways, which comprises:

a. adding thereto an alkali metal salt of a molecularly-dehydrated phosphate to a concentration of 0.0001 M to 0.1 M, b. raising the pH of the so-treated waste to a pH of 7.0, and c. precipitating and removing a calcium-protein-phosphate complex by passing the so-treated waste water through a filter bed composed essentially of a calcium ion source.

5. A method for removing proteins, starch, and other materials from brewer's waste, thereby producing both an effluent capable of disposal into municipal waste treatment systems or waterways and a solid calcium-protein-tripolyphosphate complex, said complex being susceptible to facile recovery of the valuable proteins contained therein, which comprises:

a. adding to the brewer's waste sodium tripolyphosphate until the concentration thereof is 0.01 M and calcium chloride until the concentration thereof is 0.04 M, b. precipitating a solid calcium-protein-tripolyphosphate complex by raising the pH of the so-treated waste to a pH of 7.0, and c. separating the effluent from the solid calcium-protein-tripolyphosphate complex precipitate.

6. A process for treating proteinaceous waste water obtained in the separation of starch and gluten from wheat flour, which comprises:

a. adding to the proteinaceous waste water sodium hexametaphosphate until the concentration thereof is 0.0025 M and ferric chloride until the concentration thereof is 0.0025 M, b. precipitating a solid ferric-protein-phosphate complex by raising the pH of the so-treated waste to a pH of 7.0 by addition of sodium hydroxide, and c. separating the effluent from the solid ferric-protein-phosphate complex precipitate.

* * * * *